(12) United States Patent
Hou et al.

(10) Patent No.: US 12,227,102 B2
(45) Date of Patent: Feb. 18, 2025

(54) ELECTRIC VEHICLE CHARGING MANAGEMENT METHODS AND SYSTEMS

(71) Applicant: Noodoe Group Inc., Wilmington, DE (US)

(72) Inventors: Yi-An Hou, Taipei (TW); Ming-San Huang, Taipei (TW); En-Yu Shih, Taipei (TW); Yu-Ting Liou, Taipei (TW); Chun-Hung Kung, Taipei (TW)

(73) Assignee: NOODOE GROUP INC., Wilmington, DE (US)

( * ) Notice: Subject to any disclaimer, the term of this patent is extended or adjusted under 35 U.S.C. 154(b) by 329 days.

(21) Appl. No.: 17/732,918

(22) Filed: Apr. 29, 2022

(65) Prior Publication Data
US 2022/0410758 A1    Dec. 29, 2022

(30) Foreign Application Priority Data
Jun. 28, 2021    (TW) ................... 110123514

(51) Int. Cl.
*B60L 53/68*    (2019.01)
*B60L 53/62*    (2019.01)
(Continued)

(52) U.S. Cl.
CPC ............... *B60L 53/68* (2019.02); *B60L 53/62* (2019.02); *B60L 53/67* (2019.02);
(Continued)

(58) Field of Classification Search
CPC .......... B60L 53/68; B60L 53/67; B60L 53/62; H02J 7/00032; H02J 7/0071; G01C 21/3476
See application file for complete search history.

(56) References Cited

U.S. PATENT DOCUMENTS

2010/0301809 A1* 12/2010 Bhade ............... B60L 3/0069
                                                      320/148
2011/0246252 A1* 10/2011 Uesugi ............... G06Q 10/10
                                                      705/7.12
(Continued)

*Primary Examiner* — Naeem Taslim Alam
(74) *Attorney, Agent, or Firm* — McClure, Qualey & Rodack, LLP (57) ABSTRACT

Electric vehicle charging management methods and systems are provided. A server performs a charging scheduling operation for each electric vehicle charging station to determine a specific time point for each electric vehicle charging station to perform a charging operation in which the charging operation is to charge an electric vehicle coupled with the electric vehicle charging station. When the charging operation corresponding to each electric vehicle charging station is being performed, each electric vehicle charging station transmits charging information corresponding to the charging operation to the server through a network. The server determines whether the charging operation of specific electric vehicle charging station among the electric vehicle charging stations is abnormal based on the charging information received from each electric vehicle charging station, and generates a warning notification and sends the warning notification through the network when the charging operation of the specific electric vehicle charging station is abnormal.

17 Claims, 6 Drawing Sheets

(51) Int. Cl.
*B60L 53/67* (2019.01)
*G01C 21/34* (2006.01)
*H02J 7/00* (2006.01)

(52) U.S. Cl.
CPC ...... *G01C 21/3476* (2013.01); *H02J 7/00032* (2020.01); *H02J 7/0071* (2020.01)

(56) References Cited

U.S. PATENT DOCUMENTS

| | | | |
|---|---|---|---|
| 2012/0309455 A1* | 12/2012 | Klose | B60L 53/68 |
| | | | 455/557 |
| 2013/0110632 A1* | 5/2013 | Theurer | G06F 1/266 |
| | | | 705/14.58 |
| 2014/0145854 A1* | 5/2014 | Engel | B60L 53/31 |
| | | | 340/650 |
| 2014/0312831 A1* | 10/2014 | Lewis | B60L 53/65 |
| | | | 320/107 |
| 2016/0167539 A1* | 6/2016 | Huang | H02J 3/38 |
| | | | 320/109 |
| 2018/0118045 A1* | 5/2018 | Gruzen | B60L 53/665 |
| 2019/0160958 A1* | 5/2019 | Chaudhary | B60L 53/665 |
| 2019/0232813 A1* | 8/2019 | Kusumi | B60L 53/305 |
| 2019/0322185 A1* | 10/2019 | Kinomura | B60L 53/62 |
| 2020/0376972 A1* | 12/2020 | Martin | B60L 53/57 |
| 2022/0242264 A1* | 8/2022 | Niwa | B60L 3/0046 |

* cited by examiner

ELECTRIC VEHICLE CHARGING MANAGEMENT METHODS AND SYSTEMS

BACKGROUND OF THE INVENTION

Field of the Invention

The disclosure relates generally to electric vehicle charging management methods and systems, and, more particularly to electric vehicle charging management methods and systems that can manage the charging schedule and route of the electric vehicle according to the charging operation states.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

Additionally, traditional transportation vehicles, such as buses or freight fleets, need to use a lot of gasoline or diesel as fuel, which are highly polluting vehicles. In order to reduce the harm of carbon emissions to the environment, governments are also committed to developing electric vehicle fleets that use electricity to replace traditional gasoline fleets. Generally, electric vehicles for transportation, such as electric buses or freight fleets, may have multiple different routes, and each route may include multiple fixed stops/stations. The driver can perform various services at each station according to the assigned route, such as the service of picking up and dropping off passengers, or the delivery of goods. Due to the high utilization rate of the vehicles of the fleet, many difficulties and inconveniences have also occurred in the charging and cost management of electric vehicles. For example, according to the attributes of different companies, some companies need to charge all their electric vehicles at the same time at night, while some companies require drivers to charge during the course of their business. However, when the charging operation of some electric vehicles is abnormal due to specific reasons, so that the charging operation is interrupted or the charging cannot be completed smoothly, because the relevant personnel cannot know the charging state of these vehicles at the first time and handle them in time, these electric vehicles may not be dispatched for delivering goods, resulting in travel delay or failure to successfully complete the follow-up route task, or the need to temporarily readjust other vehicles to share the goods of those vehicles, thereby increasing the difficulty of vehicle scheduling, causing complaints from customers, and further hindering the development of electric fleets.

BRIEF SUMMARY OF THE INVENTION

In an embodiment of an electric vehicle charging management method with flexible adjustment of charging schedule, which is applicable to a charging field including a plurality of electric vehicle charging stations, and the electric vehicle charging stations are connected to a server through a network. the server performs a charging scheduling operation for each of the electric vehicle charging stations to determine a specific time point for each of the electric vehicle charging stations to perform a charging operation, wherein the charging operation is to charge an electric vehicle coupled with the electric vehicle charging station. When the charging operation corresponding to each electric vehicle charging station is being performed, each electric vehicle charging station transmits charging information corresponding to the charging operation to the server through the network. Then, the server determines whether the charging operation of a specific electric vehicle charging station among the electric vehicle charging stations is abnormal based on the charging information received from each electric vehicle charging station. When the charging operation of the specific electric vehicle charging station is abnormal, the server generates a warning notification and sending the warning notification through the network.

An embodiment of an electric vehicle charging management system for use in a charging field comprises a plurality of electric vehicle charging stations, and a server. Each electric vehicle charging station has a network connection capability, and connects to the server through a network. The server performs a charging scheduling operation for each of the electric vehicle charging stations to determine a specific time point for each of the electric vehicle charging stations to perform a charging operation, wherein the charging operation is to charge an electric vehicle coupled with the electric vehicle charging station. The server receives from each electric vehicle charging station charging information corresponding to the charging operation through a network when the charging operation corresponding to each electric vehicle charging station is being performed. The server determines whether the charging operation of a specific electric vehicle charging station among the electric vehicle charging stations is abnormal based on the charging information received from each electric vehicle charging station. When the charging operation of the specific electric vehicle charging station is abnormal, the server generates a warning notification and sending the warning notification through the network.

In some embodiments, the server further obtains a time-of-use (TOU) rate and performs a charging scheduling operation for each of the electric vehicle charging stations according to the TOU rate.

In some embodiments, the server further causes a route planning system to adjust a planned route of at least one target electric vehicle to reassign at least one of the goods and corresponding one of the distribution locations of the electric vehicle originally assigned to the electric vehicle coupled to the specific electric vehicle charging station to the target electric vehicle.

In some embodiments, the server further adjusts the specific time point of the charging operation corresponding to a target electric vehicle charging station among the electric vehicle charging stations according to the planned route adjusted corresponding to the target electric vehicle, wherein the target electric vehicle is coupled to the target electric vehicle charging station.

In some embodiments, the server further provides at least one energy management scheme, which records a power distribution logic for controlling the charging operation for each of the electric vehicle charging stations. The server executes the energy management scheme, thus to determine a corresponding target power parameter value for the charging operation of each electric vehicle charging station, and perform the charging operations accordingly for respective electric vehicles through the respective electric vehicle charging stations. The server adjusts the target power parameter value corresponding to the charging operation of a specific electric vehicle charging station among the electric vehicle charging stations according to the planned route adjusted corresponding to the target electric vehicle.

In some embodiments, the server further adjusts the target power parameter value corresponding to the charging operation of each of the electric vehicle charging stations by the server, wherein the sum of the adjusted target power parameter of each of the electric vehicle charging stations is not higher than a power limit corresponding to the charging field.

In some embodiments, the server further determines that the charging operation corresponding to the specific electric vehicle charging station is abnormal when the charging information corresponding to the specific electric vehicle charging station indicates that the specific electric vehicle charging station has stopped outputting power to the coupled electric vehicle for more than a predetermined time period.

In some embodiments, the server further estimates a charging end time of the charging operation corresponding to each of the electric vehicle charging stations in the charging scheduling operation and determines that the charging operation corresponding to the specific electric vehicle charging station is abnormal by the server when the specific electric vehicle charging station does not stop outputting power to the coupled electric vehicle at the corresponding charging end time, and the specific electric vehicle charging station has stopped outputting power to the coupled electric vehicle for more than a predetermined period.

In some embodiments, a backup charging operation is further performed through a backup electric vehicle charging station, so as to charge a backup electric vehicle coupled to the backup electric vehicle charging station.

Electric vehicle charging management methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
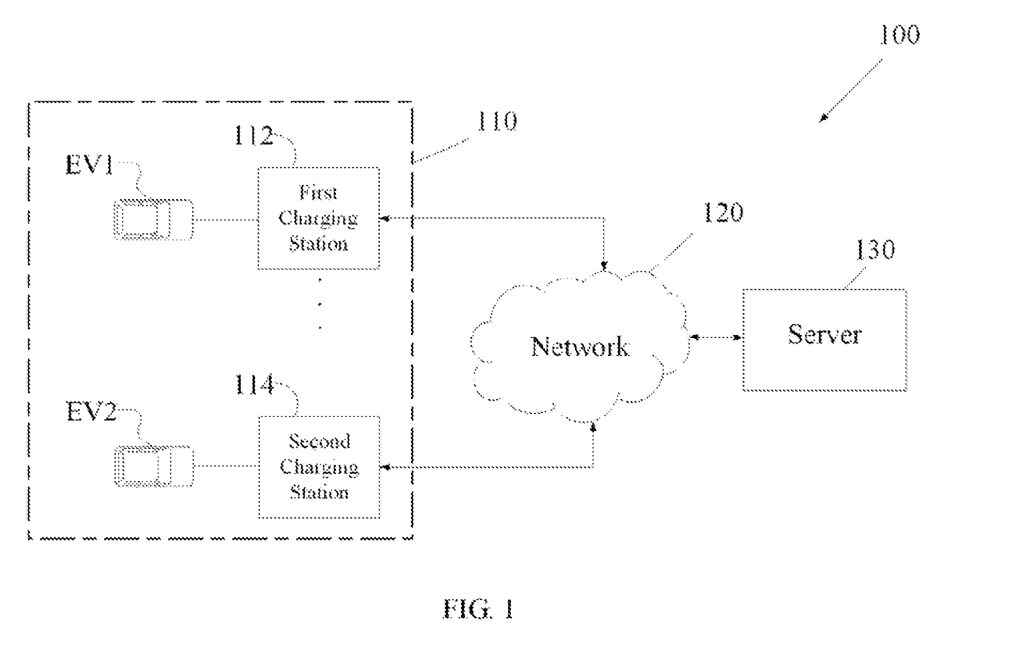
FIG. 1 is a schematic diagram illustrating an embodiment of an embodiment of an electric vehicle charging management system of the invention.

FIG. 1 is a schematic diagram illustrating an embodiment of an electric vehicle charging management system of the invention. The electric vehicle charging management system 100 can be used in a charging filed 110 with a plurality of electric vehicle charging stations. It is noted that, the charging filed 110 has a power limitation. As shown in FIG. 1, the electric vehicle charging management system 100 comprises a plurality of electric vehicle charging stations, such as a first charging station 112 and a second charging station 114, and a server 130 respectively connected with the first charging station 112 and the second charging station 114 via a network 120. The respective charging stations can provide electric vehicles (EV1, EV2) for charging operations. In some embodiments, the network 120 may be a wired network, a telecommunication network, and a wireless network, such as a Wi-Fi network. The server 130 can respectively receive various data from the first charging station 112 and the second charging station 114, and transmit related signals to the first charging station 112 and the second charging station 114. The first charging station 112 and the second charging station 114 can perform related operations according to the signals received from the server 130. For example, when the electric vehicle EV1 is coupled to the first charging station 112 through a charging gun of the first charging station 112 for a charging operation, the first charging station 112 can continuously transmit charging information corresponding the charging operation of the electric vehicle EV1 via the network 120, and the server 130 can receive the charging information of the corresponding charging operation from the first charging station 112 via the network 120. Similarly, when the electric vehicle EV2 is coupled to the second charging station 114 through a charging gun of the second charging station 114 to perform a charging operation, the second charging station 114 can continuously transmit the charging information corresponding the charging operation of the electric vehicle EV2 via the network 120, and the server 130 can receive the charging information of the corresponding charging operation from the second charging station 114 via the network 120. In some embodiments, the charging information may include at least a charging start time, a charging period, an output power, and/or related information indicating whether a load adjustment operation is being performed. The server 130 can know the usage status of the corresponding electric vehicle charging station according to the charging information.

It is noted that the user can connect the electric vehicle EV1 and the first charging station 112 to each other, such as inserting a charging gun into the charging port of the electric vehicle to send a charging request corresponding to the first charging station 112 to use the first charging station 112. The first charging station 112 performs a charging operation for the electric vehicle EV1. Similarly, the user can connect the electric vehicle EV2 and the second charging station 114 to each other, such as inserting a charging gun into the charging port of the electric vehicle to send a charging request corresponding to the second charging station 114 to use the second charging station 114. It is understood that, in some embodiments, the server 130 may directly or indirectly receive a charging request from a mobile device (not shown in FIG. 1) of the owner of the electric vehicle EV1, and generate a charging authorization command based on the charging request and transmit it to the first charging station 112 via the network 120, so that the first charging station 112 outputs power to the electric vehicle EV1, such as an electric scooter or an electric car, which is electrically connected to it, or prohibits the first charging station 112 from outputting power to the electric vehicle EV1. It is reminded that, in some embodiments, the charging request may be accompanied by an identity authentication and/or a payment mechanism, and the charging authorization command will only be generated after the identity authentication and/or payment mechanism is completed. In some embodiments, the user of the electric vehicle EV1 can use his/her mobile device to download and install an application to generate a charging request through the user interface of the application. In some embodiments, the user can scan a Quick Response Code (QR code) on the first charging station 112 through the scanning function of the application to generate the above-mentioned charging request, thereby starting a charging operation. In some embodiments, the user can select a specific charging station through the application and execute an activation function to generate the above-mentioned charging request, thereby starting a charging operation. It is understood that, in some embodiments, the owner of the electric vehicle EV1 can use an RFID card to approach an induction area (not shown in FIG. 1) on the first charging station 112 to generate a corresponding charging request, and sent it to the server 130 via the network 120. It is reminded that, in some embodiments, each user can have an RFID card.

It is noted that, the device corresponding to the owner of the electric vehicle can be any electronic device capable of Internet access, such as mobile devices, such as mobile phones, smart phones, personal digital assistants, global positioning systems, and notebook computers. In some embodiments, the mobile device can receive status information and notifications of the corresponding charging operation from the cloud management server 130 via the network 120. In some embodiments, the status information and notification may include notifying that the electric vehicle has stopped charging, notifying that the vehicle needed to be moved, and/or notifying that the charging gun of the electric vehicle charging device has been disconnected from the electric vehicle, and so on.

As mentioned above, the charging field 110 has a power limit. The server 130 can perform a load adjustment operation for the electric vehicle charging stations in the charging field 110 according to at least one energy management scheme. Specifically, the server 130 can generate an instruction and send the instruction to the respective charging station (112, 114) via the network 120 to control the charging station to output power for charging with a specified power parameter, such as a specified amperage, during a specific period of time to the electric vehicle connected to the station, or to prohibit the charging station from outputting power to the electric vehicle. It is noted that, in some embodiments, when the server 130 receives the charging requests from the charging stations, a charging scheduling operation may be performed for the charging requests. In some embodiments, the charging scheduling operation may be performed in conjunction with a time-of use (TOU) rate. For example, when the electric vehicle and the charging station are connected to each other, for example, after the charging gun is inserted into the charging port of the electric vehicle, the corresponding charging operation will not be executed immediately. The server will schedule the charging operation for the respective electric vehicles according to the TOU rate, the power limit of the charging field, and the electric vehicles that needs to be charged, determine an appropriate charging time point for each charging operation, and accordingly execute the respective charging operations with the lowest electricity cost.

Figure 2:
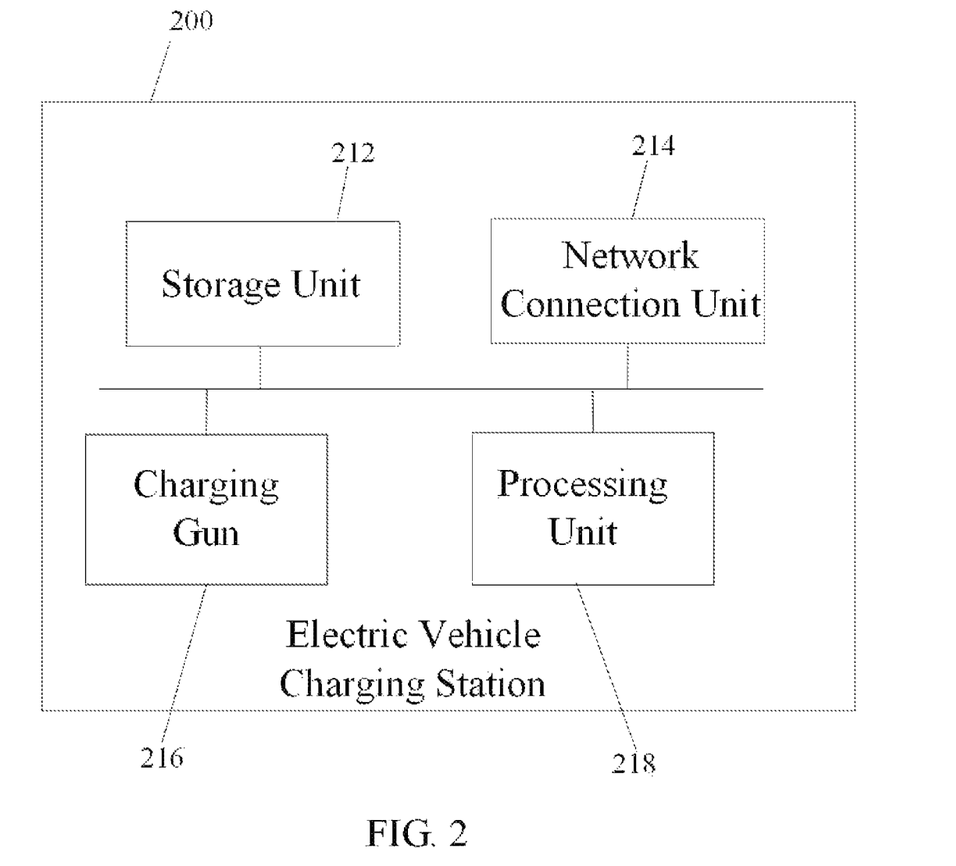
FIG. 2 is a schematic diagram illustrating an embodiment of an electric vehicle charging station of the invention.

FIG. 2 is a schematic diagram illustrating an embodiment of an electric vehicle charging station of the invention. The electric vehicle charging station 200 shown in FIG. 2 can be applied to the first charging station 112 and the second charging station 114 in FIG. 1, which has processing and computing capabilities to perform charging management operations for the electric vehicle charging station. The electric vehicle charging station 200 has a network connection capability to receive, download or update various parameters and information required for charging management calculations.

The electric vehicle charging station 200 at least comprises a storage unit 212, a network connection unit 214, a charging gun 216, and a processing unit 218. The storage unit 212 may be a memory or a database for storing and recording related data. The data may be related information such as charging station ID of the electric vehicle charging station and charging requests. It should be noted that the aforementioned information is only example, and the invention is not limited thereto. The network connection unit 214 can use a network, such as a wired network, a telecommunications network, and a wireless network, such as a Wi-Fi network, to receive, download, or update various parameters and information required for charging management operations. The charging gun 216 may include one or more charging connectors that meet the same charging interface specification or meet different charging interface specifications, and are electrically connected to the corresponding electric vehicle. The processing unit 218 can control the operations of related software and hardware in the electric vehicle charging station 200, and cooperate with the server 130 to execute the methods of the invention. Related details will be described later. It is noted that, in some embodiments, the processing unit 218 may be a general-purpose controller, a Micro-Control Unit, MCU, or a Digital Signal Processor, DSP, etc., to provide functions of data analysis, processing and calculation, but the present invention is not limited to this. In one embodiment, the processing unit 218 may use the network connection unit 214 to transmit the power state of the corresponding electric vehicle through a network for a cloud management server, such as the cloud server 130, for subsequent charging management. In another embodiment, the processing unit 218 can obtain the power parameter of a charging operation from the server 130, determine the output power according to the power parameter received from the server 130, and output the power to at least one electric vehicle through the charging gun 216 to perform the charging operation. It is understood that, in some embodiments, the electric vehicle charging station 200 may comprise a card reading unit, such as an RFID reading unit for sensing information of a physical card, such as RFID card. The information sensed from the RFID card may be a card identification code of the physical card.

It is understood that, the electric vehicle charging station 200 has an upper power limit value and a lower power limit value. Specifically, the electric vehicle charging station 200 can use the upper power limit value as the power parameter at the highest to output power to the electric vehicle during a charging operation. On the other hand, the electric vehicle charging station 200 needs to use the lower power limit value as the power parameter at least to output power to the electric vehicle during a charging operation. It must be noted that, charging stations of different brands and models may have different upper power limit values for output power and lower power limit values for output power. The present invention is not limited to any value, and the value may be different for different charging stations.

Figure 3:
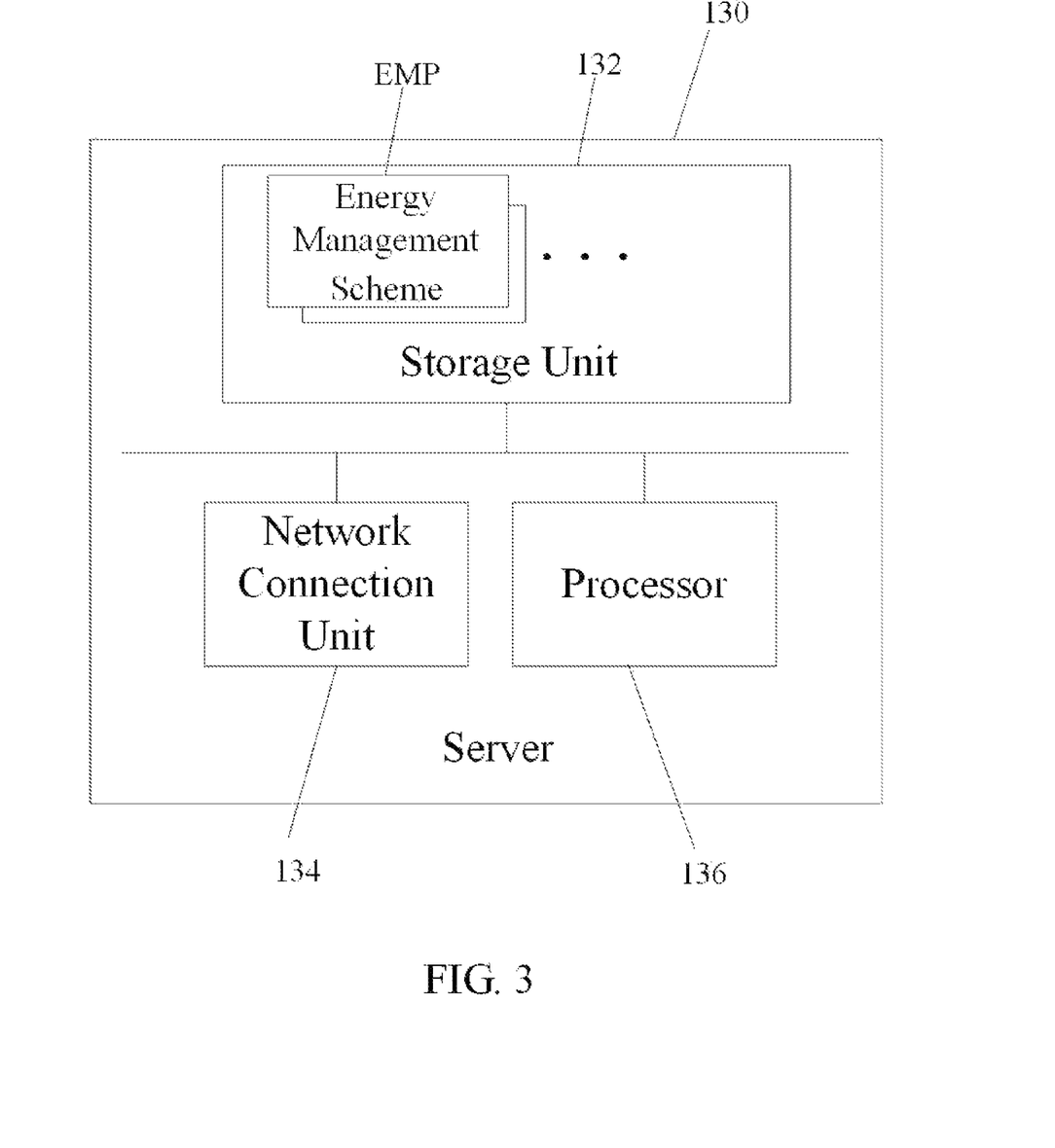
FIG. 3 is a schematic diagram illustrating an embodiment of a server of the invention.

FIG. 3 is a schematic diagram illustrating an embodiment of a server of the invention. As shown in FIG. 3, the server 130 of the invention can be any processor-based electronic device, which comprises at least a storage unit 132, a network connection unit 134, and a processor 136. It is noted that, the server 130 can receive various data corresponding to a plurality of electric vehicle charging stations in a charging field. The server 130 can directly or indirectly receive a charging request from a mobile device, and after completing actions such as identity confirmation in response to the charging request, generate a charging authorization command and transmit it to the corresponding electric vehicle charging station via the network. In response to the charging authorization command, the electric vehicle charging station is allowed to output power to an electric vehicle (for example, an electric motorcycle or an electric vehicle, etc.) that is electrically connected to it, or prohibit the electric vehicle charging station from outputting power to the electric vehicle.

The storage unit 132 may be a memory, which can store and record related data, such as various data of the electric vehicle charging stations. It is noted that, the storage unit 132 may include at least one energy management scheme EMP. The energy management scheme EMP records a distribution logic for controlling a charging operation of each electric vehicle charging station. It is reminded that, the power distribution logic is configured to determine the execution order of the individual charging requests (charging operations) of the corresponding charging stations, and the corresponding target power parameter value during the respective charging operations under the power limitation of the charging field. It should be noted that, in some embodiments, the storage unit 132 may include a time setting table for setting at least one peak period and one off-peak period, and a corresponding TOU rate. Through the network connection unit 134, the server 130 can be coupled to and communicates with the electric vehicle charging stations (112, 114) via the network 120, such as a wired network, a telecommunications network, and a wireless network, such as a Wi-Fi network, and transmits related data/signals/commands to different electric vehicle charging stations via the network 120 to control whether the electric vehicle charging stations output power, and specify power parameters for outputting power to electric vehicles. The processor 136 can control the operations of related software and hardware in the server 130, and execute the methods of the invention. The relevant details will be described later. It is reminded that, when the server has multiple energy management schemes EMP, the processor 136 can select one of the energy management schemes EMP and execute a load adjustment operation for the charging field according to the selected energy management scheme EMP. It should be noted that, in some embodiments, the processor 136 may be a general-purpose controller, a microcontroller, or a digital signal controller, etc., for providing data analysis, processing and computing functions, but the present invention is not limited thereto. It should be reminded that, as mentioned above, the server may execute a charging scheduling operation for the charging requests of the electric vehicle charging stations. In some embodiments, the charging scheduling operation can be performed with the TOU rate, so that all charging operations can be performed with the lowest electricity cost.

It should be understood that each of the elements, units or modules in the present embodiments may be a device having a corresponding function, which can have the appropriate hardware circuits or elements to perform the corresponding function, however, the device is not limited to be entity device, which can also be a virtual device having program and software with respective functions or a device having capabilities for processing and running the program and software. The manner of operations of the respective elements can further refer to the following description of the methods.

Figure 4:
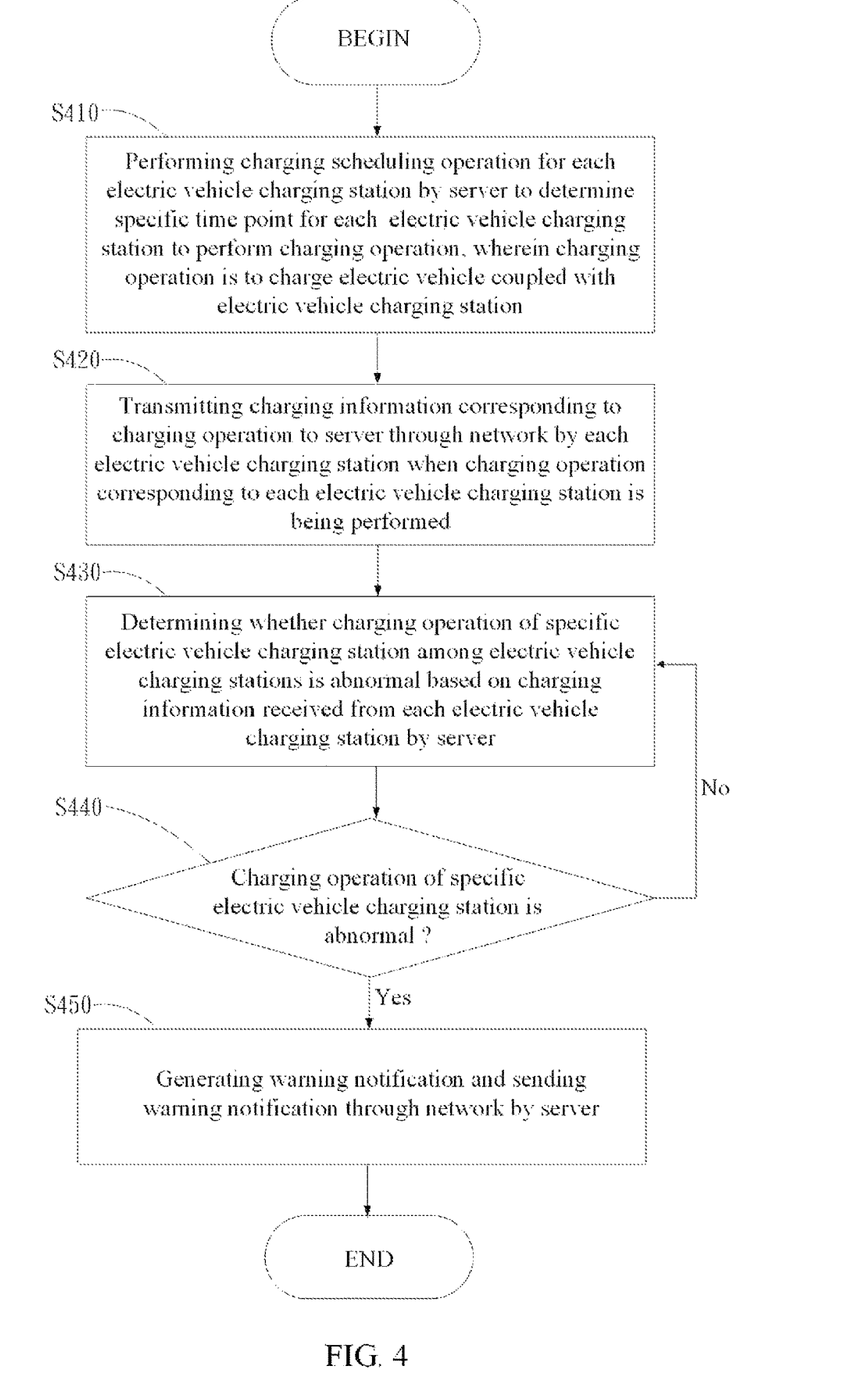
FIG. 4 is a flowchart of an embodiment of an electric vehicle charging management method of the invention.

FIG. 4 is a flowchart of an embodiment of an electric vehicle charging management method of the invention. The electric vehicle charging management method of the invention is applicable to a charging field comprising a plurality of charging stations, and the charging field has a power limit. The respective electric vehicle charging station in the charging field can be electrically coupled with a remote server via a network. In one example, the charging field may belong to a logistics operator for charging the electric vehicles it distributes goods.

First, in step S410, the server executes a charging scheduling operation for each electric vehicle charging station to determine a specific time point for each electric vehicle charging station to perform a charging operation, wherein the charging operation is to charge an electric vehicle coupled to an electric vehicle charging station. It is understood that, as mentioned above, in some embodiments, the charging scheduling operation can be performed with the TOU rate. The server can schedule the charging according to the TOU rate, the power limit of the charging field, the electric vehicle that needs to be charged and a planned route for the respective electric vehicle, determine the appropriate charging time point as the specific time point, and accordingly execute all the charging operations with the lowest electricity cost. In step S420, when the charging operation corresponding to each electric vehicle charging station is being performed, each electric vehicle charging station transmits charging information corresponding to the charging operation to the server via the network. For example, when a specific electric vehicle is coupled to a first charging station through a charging gun of the first charging station for a charging operation, the first charging station can continuously transmit charging information corresponding the charging operation of the specific electric vehicle via the network, and the server can receive the charging information of the corresponding charging operation from the first charging station via the network. Then, in step S430, the server determines whether the charging operation of a specific electric vehicle charging station among the electric vehicle charging stations is abnormal based on the charging information received from each electric vehicle charging station. In some embodiments, the charging information of the corresponding specific electric vehicle charging station may indicate whether the specific electric vehicle charging station has stopped outputting power to the coupled electric vehicle for more than a predetermined time period, and when the charging information of the corresponding specific electric vehicle charging station indicates that the specific electric vehicle charging station has stopped outputting power to the coupled electric vehicles for more than the predetermined time period, the server determines that the charging operation of the specific electric vehicle charging station is abnormal. In some embodiments, the server may further estimate a charging end times for the charging operation corresponding to each electric vehicle charging station during the charging scheduling operation. When the specific electric vehicle charging station does not stop outputting power to the coupled electric vehicle at the corresponding charging end time, and the specific electric vehicle charging station has stopped outputting power to the coupled electric vehicles for more than a predetermined time period, the server determines that the charging operation of the specific electric vehicle charging station is abnormal. When the charging operation of the specific electric vehicle charging station is not abnormal (No in step S440), the flow returns to step S430. When the charging operation of the specific electric vehicle charging station is abnormal (Yes in step S440), in step S450, the server generates a warning notification and sends the warning notification through the network. In other words, the manager of the corresponding specific electric vehicle charging station can receive this warning notification via the network and is informed via the warning notification that the charging operation of the corresponding specific electric vehicle charging station is abnormal for subsequent processing.

Figure 5:
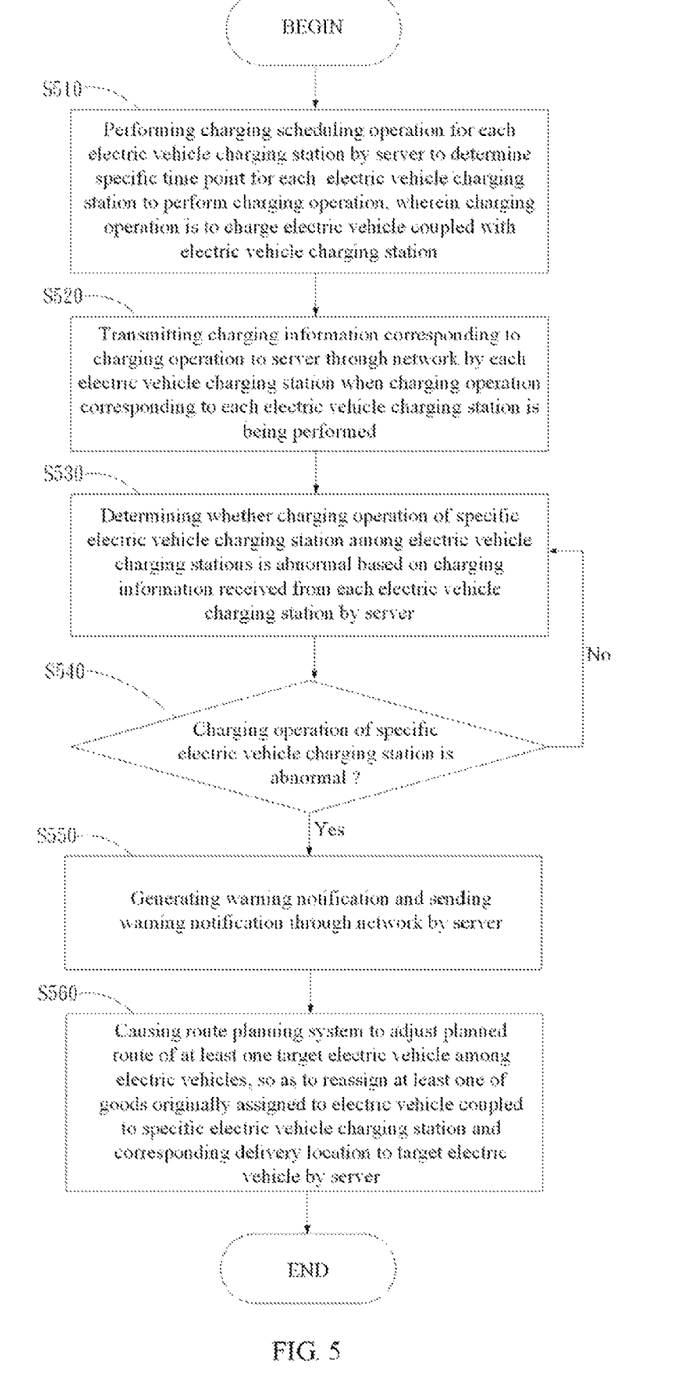
FIG. 5 is a flowchart of another embodiment of an electric vehicle charging management method of the invention.

FIG. 5 is a flowchart of another embodiment of an electric vehicle charging management method of the invention. The electric vehicle charging management method of the invention is applicable to a charging field comprising a plurality of charging stations, and the charging field has a power limit. The respective electric vehicle charging station in the charging field can be electrically coupled with a remote server via a network. In one example, the charging field may belong to a logistics operator for charging the electric vehicles it distributes goods.

First, in step S510, the server executes a charging scheduling operation for each electric vehicle charging station to determine a specific time point for each electric vehicle charging station to perform a charging operation, wherein the charging operation is to charge an electric vehicle coupled to an electric vehicle charging station. It is understood that, as mentioned above, in some embodiments, the charging scheduling operation can be performed with the TOU rate. The server can schedule the charging according to the TOU rate, the power limit of the charging field, the electric vehicle that needs to be charged and a planned route for the respective electric vehicle, determine the appropriate charging time point as the specific time point, and accordingly execute all the charging operations with the lowest electricity cost. In step S520, when the charging operation corresponding to each electric vehicle charging station is being performed, each electric vehicle charging station transmits charging information corresponding to the charging operation to the server via the network. For example, when a specific electric vehicle is coupled to a first charging station through a charging gun of the first charging station for a charging operation, the first charging station can continuously transmit charging information corresponding the charging operation of the specific electric vehicle via the network, and the server can receive the charging information of the corresponding charging operation from the first charging station via the network. Then, in step S530, the server determines whether the charging operation of a specific electric vehicle charging station among the electric vehicle charging stations is abnormal based on the charging information received from each electric vehicle charging station. In some embodiments, the charging information of the corresponding specific electric vehicle charging station may indicate whether the specific electric vehicle charging station has stopped outputting power to the coupled electric vehicle for more than a predetermined time period, and when the charging information of the corresponding specific electric vehicle charging station indicates that the specific electric vehicle charging station has stopped outputting power to the coupled electric vehicles for more than the predetermined time period, the server determines that the charging operation of the specific electric vehicle charging station is abnormal. In some embodiments, the server may further estimate a charging end time for the charging operation corresponding to each electric vehicle charging station during the charging scheduling operation. When the specific electric vehicle charging station does not stop outputting power to the coupled electric vehicle at the corresponding charging end time, and the specific electric vehicle charging station has stopped outputting power to the coupled electric vehicles for more than a predetermined time period, the server determines that the charging operation of the specific electric vehicle charging station is abnormal. When the charging operation of the specific electric vehicle charging station is not abnormal (No in step S540), the flow returns to step S530. When the charging operation of the specific electric vehicle charging station is abnormal (Yes in step S540), in step S550, the server generates a warning notification and sends the warning notification through the network. In other words, the manager of the corresponding specific electric vehicle charging station can receive this warning notification via the network and is informed via the warning notification that the charging operation of the corresponding specific electric vehicle charging station is abnormal for subsequent processing.

In step S560, the server causes a route planning system to adjust a planned route of at least one target electric vehicle among the electric vehicles, so as to reassign at least one of the goods originally assigned to an electric vehicle coupled to the specific electric vehicle charging station and the corresponding delivery location to the target electric vehicle. Specifically, since each electric vehicle has a corresponding planned route, which includes at least one of the goods and a corresponding distribution location, when the charging operation corresponding to the specific electric vehicle charging station is abnormal, it means that the electric vehicle will not be able to complete the delivery of the goods on the originally planned route, thereby causing a delay in the delivery schedule of goods. Therefore, the server can cause the route planning system to adjust the planned route of at least one target electric vehicle among the electric vehicles, and reassign at least one of the goods and the corresponding delivery location that was originally assigned to the electric vehicle coupled to the specific electric vehicle charging station to the target electric vehicle. In other words, the goods originally belonging to that electric vehicle will be reassigned to another target electric vehicle for delivery without delaying the delivery schedule of the goods.

Figure 6:
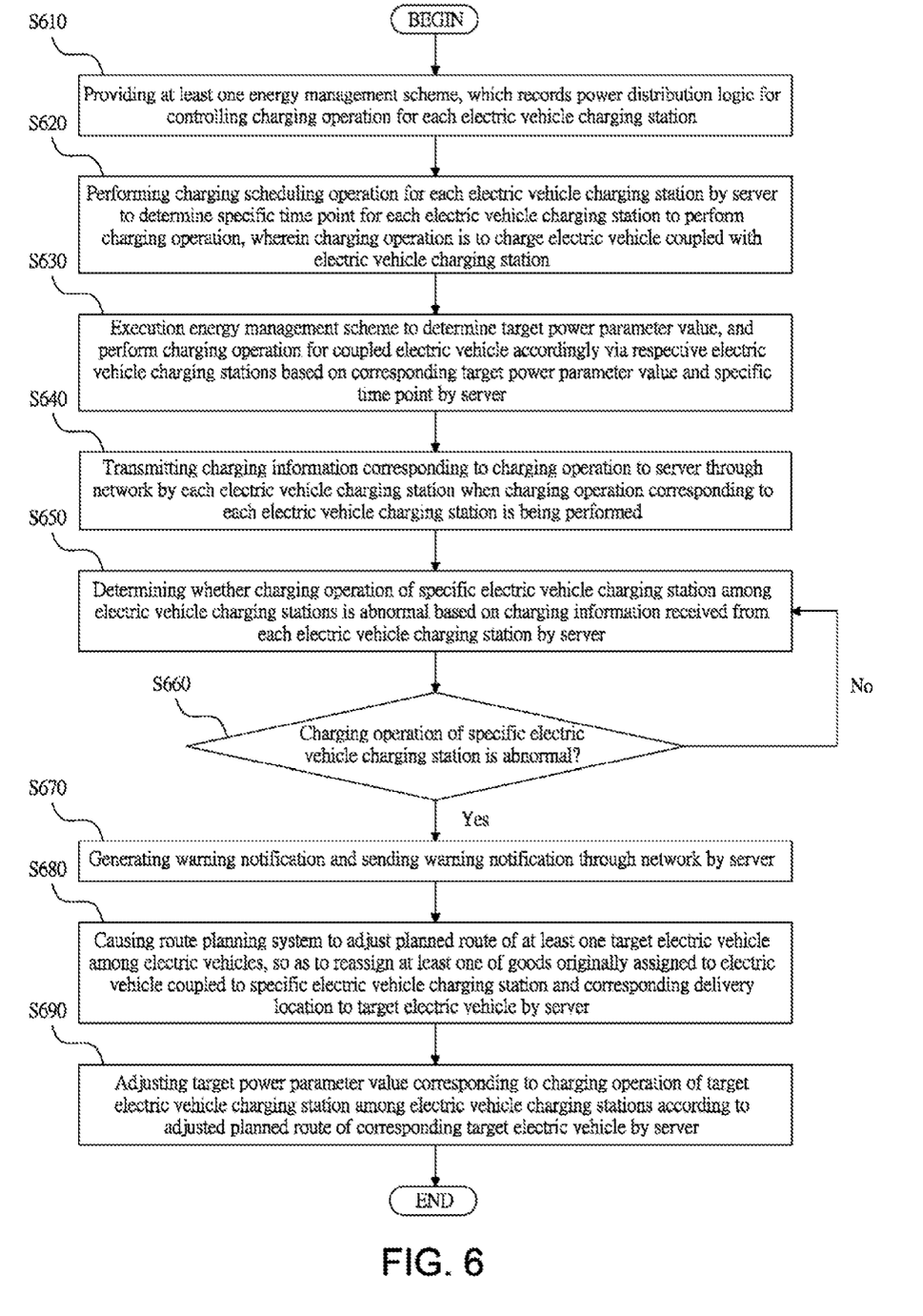
FIG. 6 is a flowchart of yet another embodiment of an electric vehicle charging management method of the invention.

FIG. 6 is a flowchart of yet another embodiment of an electric vehicle charging management method of the invention. The electric vehicle charging management method of the invention is applicable to a charging field comprising a plurality of charging stations, and the charging field has a power limit. The respective electric vehicle charging station in the charging field can be electrically coupled with a remote server via a network. In one example, the charging field may belong to a logistics operator for charging the electric vehicles it distributes goods.

In some embodiments, at least one energy management scheme is provided on the server, wherein the energy management scheme may record a distribution logic to control a charging operation of each electric vehicle charging station. The server may execute the energy management scheme to determine a target power parameter value for the charging operation of each electric vehicle charging station, and accordingly perform the charging operations for the coupled electric vehicles via the respective electric vehicle charging stations. The server adjusts the target power parameter value for the charging operation corresponding to a target electric vehicle charging station among the electric vehicle charging stations according to the planned route after adjustment of the corresponding target electric vehicle.

First, in step S610, at least one energy management scheme is provided on the server. As mentioned above, the energy management scheme may record a distribution logic to control a charging operation of each electric vehicle charging station. It is reminded that, the power distribution logic is configured to determine the execution order of the individual charging requests (charging operations) of the corresponding charging stations, and the corresponding target power parameter value during the charging operation under the power limitation of the charging field. In step S620, the server executes a charging scheduling operation for each electric vehicle charging station to determine a specific time point for each electric vehicle charging station to perform a charging operation, wherein the charging operation is to charge an electric vehicle coupled to an electric vehicle charging station. In step S630, the server executes the energy management scheme to determine a target power parameter value for the charging operation of each electric vehicle charging station, and accordingly perform the charging operations for the coupled electric vehicles via the respective electric vehicle charging stations based on the corresponding target power parameter value and the specific time point for performing the charging operation. For example, when the total number of the electric vehicle charging stations that need to perform charging operations multiplied by the power upper limit value of individual electric vehicle charging stations is greater than the power limit of the charging field, the power (target power parameter value) of each electric vehicle charging station will be scaled down, so that the total output power does not exceed the power limit of the charging field.

In step S640, when the charging operation corresponding to each electric vehicle charging station is being performed, each electric vehicle charging station transmits charging information corresponding to the charging operation to the server via the network. For example, as mentioned above, when a specific electric vehicle is coupled to a first charging station through a charging gun of the first charging station for a charging operation, the first charging station can continuously transmit charging information corresponding the charging operation of the specific electric vehicle via the network, and the server can receive the charging information of the corresponding charging operation from the first charging station via the network. Then, in step S650, the server determines whether the charging operation of a specific electric vehicle charging station among the electric vehicle charging stations is abnormal based on the charging information received from each electric vehicle charging station. In some embodiments, the charging information of the corresponding specific electric vehicle charging station may indicate whether the specific electric vehicle charging station has stopped outputting power to the coupled electric vehicle for more than a predetermined time period, and when the charging information of the corresponding specific electric vehicle charging station indicates that the specific electric vehicle charging station has stopped outputting power to the coupled electric vehicles for more than the predetermined time period, the server determines that the charging operation of the specific electric vehicle charging station is abnormal. In some embodiments, the server may further estimate a charging end time for the charging operation corresponding to each electric vehicle charging station during the charging scheduling operation. When the specific electric vehicle charging station does not stop outputting power to the coupled electric vehicle at the corresponding charging end time, and the specific electric vehicle charging station has stopped outputting power to the coupled electric vehicles for more than a predetermined time period, the server determines that the charging operation of the specific electric vehicle charging station is abnormal. When the charging operation of the specific electric vehicle charging station is not abnormal (No in step S660), the flow returns to step S650. When the charging operation of the specific electric vehicle charging station is abnormal (Yes in step S660), in step S670, the server generates a warning notification and sends the warning notification through the network. In other words, the manager of the corresponding specific electric vehicle charging station can receive this warning notification via the network and is informed via the warning notification that the charging operation of the corresponding specific electric vehicle charging station is abnormal for subsequent processing.

Thereafter, in step S680, the server causes a route planning system to adjust a planned route of at least one target electric vehicle among the electric vehicles, so as to reassign at least one of the goods originally assigned to an electric vehicle coupled to the specific electric vehicle charging station and the corresponding delivery location to the target electric vehicle. In some embodiments, the server may adjust a specific time point of the charging operation of a target electric vehicle charging station among the corresponding electric vehicle charging stations according to the adjusted planned route of the corresponding target electric vehicle, wherein the target electric vehicle is charged with the target electric vehicle station coupling. Then, in step S690, the server adjusts the target power parameter value corresponding to the charging operation of a target electric vehicle charging station among the electric vehicle charging stations according to the adjusted planned route of the corresponding target electric vehicle. In this case, after the target charging station performs the charging operation according to the adjusted target power parameter value, the target electric vehicle can have enough battery power to complete the planned route after adjustment. It must be noted that, the predetermined power value can be set according to different industries and applications. In some embodiments, the predetermined power value may be 80% of the battery capacity of the electric vehicle. In some embodiments, the setting of the predetermined power value can also be adjusted. It should be noted that, in some embodiments, if the adjusted target power parameter corresponding to the charging operation of the specific charging station causes the total amount of power required by all charging operations to exceed the power limit of the charging field, the target power parameter values of other charging operations will also be adjusted, such as reduced, to ensure that the total power required for charging does not exceed the power limit of the charging field. In some embodiments, the server may adjust the target power parameter value corresponding to the charging operation of each electric vehicle charging station, where the sum of the adjusted target power parameter values for each electric vehicle charging station is not higher than the power limit of the charging field. In some embodiments, at least one backup electric vehicle charging station may be provided and the server may perform a backup charging operation via a backup electric vehicle charging station to charge a backup electric vehicle coupled to the backup electric vehicle charging station.

Therefore, the electric vehicle charging management methods and systems of the invention can manage the charging schedule of electric vehicles belonging to the fleet, generate warning notifications to notify the relevant personnel when the charging operation of a specific vehicle is abnormal, and/or directly reassign the goods originally planned for a specific vehicle to the route of other vehicles, thus reducing the chance of delay in goods delivery and the need for temporary dispatch, and further increasing the flexibility of vehicle management and dispatch.

Electric vehicle charging management methods, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. An electric vehicle charging management method, which is applicable to a charging field including a plurality of electric vehicle charging stations, and the electric vehicle charging stations are connected to a server through a network, comprising:
    providing at least one energy management scheme, which records a power distribution logic for controlling the charging operation for each of the electric vehicle charging stations by the server;
    performing a charging scheduling operation for each of the electric vehicle charging stations by the server to determine a specific time point for each of the electric vehicle charging stations to perform a charging operation, wherein the charging operation is to charge an electric vehicle coupled with the respective electric vehicle charging station;
    executing the energy management scheme by the server to determine a corresponding target power parameter value for the charging operation of each electric vehicle charging station, and performing the charging operations accordingly for respective electric vehicles through the respective electric vehicle charging stations;
    when the charging operation corresponding to each electric vehicle charging station is being performed, transmitting, by each electric vehicle charging station, charging information corresponding to the charging operation to the server through the network;
    determining whether the charging operation of a specific electric vehicle charging station among the electric vehicle charging stations is abnormal based on the charging information received from each electric vehicle charging station by the server; and
    when the charging operation of the specific electric vehicle charging station is abnormal during the performance of the charging operation for the specific electric vehicle charging station, generating a warning notification and sending the warning notification through the network by the server and sending instructions to a route planning system by the server to enable the route planning system to adjust a planned route of at least one target electric vehicle to reassign at least one of a plurality of goods and a corresponding one of a plurality of distribution locations of an electric vehicle originally assigned to an electric vehicle coupled to the specific electric vehicle charging station to the at least one target electric vehicle.

2. The method of claim 1, further comprising a step of obtaining a time-of-use (TOU) rate and performing a charging scheduling operation for each of the electric vehicle charging stations according to the TOU rate by the server.

3. The method of claim 1, further comprising the server adjusting the specific time point of the charging operation corresponding to a target electric vehicle charging station among the electric vehicle charging stations according to the planned route adjusted corresponding to the target electric vehicle, wherein the target electric vehicle is coupled to the target electric vehicle charging station.

4. The method of claim 1, further comprising:
    adjusting the target power parameter value corresponding to the charging operation of a specific electric vehicle charging station among the electric vehicle charging stations according to the planned route adjusted corresponding to the target electric vehicle by the server.

5. The method of claim 4, further comprising a step of adjusting the target power parameter value corresponding to the charging operation of each of the electric vehicle charging stations by the server, wherein a sum of the adjusted target power parameter values of each of the electric vehicle charging stations is not higher than a power limit corresponding to the charging field.

6. The method of claim 1, further comprising:
    determining that the charging operation corresponding to the specific electric vehicle charging station is abnormal by the server when the charging information corresponding to the specific electric vehicle charging station indicates that the specific electric vehicle charging station has stopped outputting power to the coupled electric vehicle for more than a predetermined time period.

7. The method of claim 6, further comprising:
    estimating a charging end time of the charging operation corresponding to each of the electric vehicle charging stations in the charging scheduling operation by the server; and
    determining that the charging operation corresponding to the specific electric vehicle charging station is abnormal by the server when the specific electric vehicle charging station has stopped outputting power to the coupled electric vehicle for more than a predetermined period from a specific time point in which the specific time point is not matched with the corresponding charging end time.

8. The method of claim 1, further comprising:
performing a backup charging operation through a backup electric vehicle charging station, so as to charge a backup electric vehicle coupled to the backup electric vehicle charging station.

9. An electric vehicle charging management system for use in a charging field, comprising:
a plurality of electric vehicle charging stations, each having a network connecting capability; and
a server arranged for performing a charging scheduling operation for each of the electric vehicle charging stations to determine a specific time point for each of the electric vehicle charging stations to perform a charging operation, wherein the charging operation is to charge an electric vehicle coupled with the respective electric vehicle charging station, receiving from each electric vehicle charging station charging information corresponding to the charging operation through a network when the charging operation corresponding to each electric vehicle charging station is being performed, determining whether the charging operation of a specific electric vehicle charging station among the electric vehicle charging stations is abnormal based on the charging information received from each electric vehicle charging station by the server, and generating a warning notification and sending the warning notification through the network when the charging operation of the specific electric vehicle charging station is abnormal during the performance of the charging operation for the specific electric vehicle charging station,
wherein the server further provides at least one energy management scheme, which records a power distribution logic for controlling the charging operation for each of the electric vehicle charging stations, executes the energy management scheme to determine a corresponding target power parameter value for the charging operation of each electric vehicle charging station, and performs the charging operations accordingly for respective electric vehicles through the respective electric vehicle charging stations, and the server further sends instructions to a route planning system to enable the route planning system to adjust a planned route of at least one target electric vehicle to reassign at least one of a plurality of goods and a corresponding one of a plurality of distribution locations of an electric vehicle originally assigned to an electric vehicle coupled to the specific electric vehicle charging station to the at least one target electric vehicle.

10. The system of claim 9, wherein the server further obtains a time-of-use (TOU) rate and performs a charging scheduling operation for each of the electric vehicle charging stations according to the TOU rate.

11. The system of claim 9, wherein the server further adjusts the specific time point of the charging operation corresponding to a target electric vehicle charging station among the electric vehicle charging stations according to the planned route adjusted corresponding to the target electric vehicle, wherein the target electric vehicle is coupled to the target electric vehicle charging station.

12. The system of claim 9, wherein the server further adjusts the target power parameter value corresponding to the charging operation of a specific electric vehicle charging station among the electric vehicle charging stations according to the planned route adjusted corresponding to the target electric vehicle.

13. The system of claim 12, wherein the server further adjusts the target power parameter value corresponding to the charging operation of each of the electric vehicle charging stations by the server, wherein a sum of the adjusted target power parameter values of each of the electric vehicle charging stations is not higher than a power limit corresponding to the charging field.

14. The system of claim 9, wherein the server further determines that the charging operation corresponding to the specific electric vehicle charging station is abnormal when the charging information corresponding to the specific electric vehicle charging station indicates that the specific electric vehicle charging station has stopped outputting power to the coupled electric vehicle for more than a predetermined time period.

15. The system of claim 14, wherein the server further estimates a charging end time of the charging operation corresponding to each of the electric vehicle charging stations in the charging scheduling operation and determines that the charging operation corresponding to the specific electric vehicle charging station is abnormal when the specific electric vehicle charging station has stopped outputting power to the coupled electric vehicle for more than a predetermined period from a specific time point in which the specific time point is not matched with the corresponding charging end time.

16. The method of claim 9, wherein the server further performs a backup charging operation through a backup electric vehicle charging station, so as to charge a backup electric vehicle coupled to the backup electric vehicle charging station.

17. A non-transitory machine-readable storage medium comprising a computer program, which, when executed, causes a device to perform an electric vehicle charging management method, which is applicable to a charging field including a plurality of electric vehicle charging stations, and the electric vehicle charging stations are connected to a server through a network, wherein the method comprises:
providing at least one energy management scheme, which records a power distribution logic for controlling the charging operation for each of the electric vehicle charging stations by the server;
performing a charging scheduling operation for each of the electric vehicle charging stations by the server to determine a specific time point for each of the electric vehicle charging stations to perform a charging operation, wherein the charging operation is to charge an electric vehicle coupled with the respective electric vehicle charging station;
executing the energy management scheme by the server to determine a corresponding target power parameter value for the charging operation of each electric vehicle charging station, and performing the charging operations accordingly for respective electric vehicles through the respective electric vehicle charging stations;
when the charging operation corresponding to each electric vehicle charging station is being performed, transmitting, by each electric vehicle charging station, charging information corresponding to the charging operation to the server through the network;
determining whether the charging operation of a specific electric vehicle charging station among the electric vehicle charging stations is abnormal based on the charging information received from each electric vehicle charging station by the server; and when the charging operation of the specific electric vehicle charging station is abnormal during the performance of the charging operation for the specific electric vehicle charging station, generating a warning notification and sending the warning notification through the network by the server and sending instructions to a route planning system by the server to enable the route planning system to adjust a planned route of at least one target electric vehicle to reassign at least one of a plurality of goods and a corresponding one of a plurality of distribution locations of an electric vehicle originally assigned to an electric vehicle coupled to the specific electric vehicle charging station to the at least one target electric vehicle.

\* \* \* \* \*